United States Patent [19]

Bangs et al.

[11] Patent Number: 4,717,924

[45] Date of Patent: Jan. 5, 1988

[54] THERMAL PRINTING CONTROL SYSTEM

[75] Inventors: Richard G. Bangs; Sik P. Kwan, both of Ithaca, N.Y.

[73] Assignee: NCR Corporation, Dayton, Ohio

[21] Appl. No.: 897,579

[22] Filed: Aug. 18, 1986

[51] Int. Cl.⁴ ........................ G01D 15/10; H05B 3/02; B41J 3/20

[52] U.S. Cl. ................................ 346/76 PH; 219/482; 219/483; 219/484; 219/485; 400/120

[58] Field of Search .................................... 346/76 PH; 219/482–485; 400/120

[56] References Cited

U.S. PATENT DOCUMENTS

| | | | |
|---|---|---|---|
| 3,725,898 | 4/1973 | Canton | 346/76 R |
| 4,409,600 | 10/1983 | Minowa | 346/76 PH |
| 4,462,704 | 7/1984 | Kurata et al. | 400/120 |
| 4,475,114 | 10/1984 | Koyama et al. | 346/76 PH |
| 4,510,507 | 4/1985 | Ishikawa | 346/76 PH |
| 4,524,368 | 6/1985 | Inui et al. | 346/76 PH |
| 4,563,691 | 1/1986 | Nogochi et al. | 346/76 PH |
| 4,573,058 | 2/1986 | Brooks | 346/76 PH |

*Primary Examiner*—E. A. Goldberg
*Assistant Examiner*—Gerald E. Preston
*Attorney, Agent, or Firm*—Wilbert Hawk, Jr.; Albert L. Sessler, Jr.; George J. Muckenthaler

[57] ABSTRACT

A control system for a thermal print head includes means for regulating the firing of the print elements with the proper pulse width to compensate for increasing substrate temperature. The control circuit is divided into two separate circuits—the driving circuit for turning the print elements on and off, and the decision-making circuit which executes the substrate temperature coding and control codes and sends control signals to the driving circuit. Three types of temperature compensation are utilized in the control program. A tailored pulse width is used for each bank of the print elements to compensate for various element resistances. As the print head shuttles across the record medium, the pulse width is reduced for each horizontal dot position. The pulse width also is reduced for each line printed in the format. The system may be used for either direct thermal or thermal transfer printing with both full and half dot spacing and single or double width characters.

28 Claims, 17 Drawing Figures

THERMAL PRINTING CONTROL SYSTEM

BACKGROUND OF THE INVENTION

In the area of thermal printer, it is wellknown that the use of such printers is increasing for certain operations that require a reduction in noise levels and at a reasonable cost. While development work is continually progressing to increase the speed of operation with minimum maintenance or care of the equipment, it is seen that improvements are being made to provide a higher quality print with a reduced number of thermal elements.

In the case of thermal printers, it is necessary to minimize the complexity of the thermal print head and the associated electronic controls. In certain prior are printers, it has been common practice to provide a thermal print head having a plurality of thermal printing elements on the surface of the head and wherein selected elements are energized to provide printing on thermal paper of like record media with the print head operating in a stationary or fixed position relative to the printer frame. The thermal printing elements on the print head may take the form of pads or contact surfaces in the shape of characters and connected by conducting runs to side or edge connectors. A flexible flat ribbon-like cable is normally used to connect with the pads or contact surfaces on the print head and the individual leads or wires of the cable may include end connectors or terminals for contact with the print head pads.

In more recent developments, a thermal printer may include and utilize a moving or shuttling print head and while printing speeds are less than thermal printers having fixed print heads, there are certain features or advantages of the shuttling type heads. The moving print head is usually less complex and less expensive than the fixed head. A printer using the moving print head may include a print head having a vertical row of thermal elements in an arrangement for producing characters of seven or more dots in height. Printing speeds of 30 to 50 characters a second are realized in printing one line at a time as the head moves in the direction from left to right along the line of printing. Printing speed is influenced or governed, at least in part, by the amount of time required to pulse or fire and then to cool each of the thermal elements. This amount of time is typically in the range of four to six milliseconds per dot position. A moving or shuttling print head may also be formed wherein the thermal print elements are arranged in a line of dots.

In the case of the fixed print head, the arrangement may also be in a line of dots (the print elements are positioned horizontally on the print head) and by reason, at least in part, due to the greater number of print elements used and also because the print head does not move, printing speeds of 200 or more characters per second may be achieved. Print heads of the fixed type are inherently more costly than the shuttling type and generally are used where higher resolution and higher printing speeds are required.

It should be appreciated that a typical problem in thermal type printers is the accumulation and storage of heat in the higher speed printing. The heat that is generated in the thermal printing elements during induction of current is partially used for the printing process and partially radiated through the substrate of the print head. At printing speeds generated in the range wherein the pulsing or firing cycle of operations is below 10 milliseconds, such as the four to six milliseconds per dot position mentioned above, the next printing pulse may be initiated before heat has been sufficiently radiated or dissipated from the thermal printing elements and/or substrate.

It is thus seen that heat is stored or is still retained in at least some of the heater or print elements resulting in non-uniform and uneven temperatures among the respective elements in the printing or recording operation so that the printed dots may be different from each other in size and/or density. The printing density may be affected by the number of print elements which are pulsed or energized at the same time.

It is also known that when multiple print elements are located and/or positioned on the substrate, and are fired in sequential manner to effect printing, the average temperature of the print head substrate increases as a function of time until sufficient residual heat in the substrate causes degradation of the print quality, resulting in such difference in size and/or density of the dots.

The problem of such degradation of the print quality from the increase of average temperature generated from the thermal head for printing cannot be prevented by uniform control of the entire print head nor can such problem be prevented with respect to individual print elements. The problem of increasing temperature due to the use of the thermal printing apparatus over a prolonged period of time can also result in damage to the thermal print head.

Representative documentation in the area of thermal printing and of problems associated with increasing print head temperatures includes U.S. Pat. No. 4,462,704, issued to M. Kurata et al. on July 31, 1984, which discloses a thermal head driving system having a plurality of thermal heads and wherein a pulse generator is provided between an electric power source and each of the heads for producing a driving pulse having a width adjustable and determined in accordance with a ratio of the resistance value of each thermal head.

U.S. Pat. No. 4,409,600, issued to M. Minowa on Oct. 11, 1983, discloses a thermal printer drive circuit that includes a current application time control circuit for varying the period of time during which current flows to the heat generating elements. The control circuit includes a charging circuit having a capacitor and a discharging circuit connected in parallel.

U.S. Pat. No. 4,510,507, issued to Y. Ishikawa on Apr. 9, 1985, discloses thermal recording apparatus which provides image quality through control of recording pulses by means of control of pulse width or voltage according to the level of color of the image, and also by control of pulse width at the start or at the end of each recording operation.

U.S. Pat. No. 4,524,368, issued to T. Inui et al. on June 18, 1985, discloses a thermal head drive circuit wherein improved quality is effected by using data from previously printed lines to compute a corrected pulse energy. The circuit uses a heat storage state operator for each heater element, a pulse energy operator for computing a printing pulse energy to be applied to each heater element, a memory for storing the pulse energy used in the previously printed line, and a counter to count the number of dots on the line to be printed.

U.S. Pat. No. 4,573,058, issued to R. M. Brooks on Feb. 25, 1986, discloses a thermal printer for maintaining constant printing energy by sensing voltage proportional to element resistance and developing an average printhead resistance. In response to a change in average printhead resistance, a processor maintains constant printing energy by changing the printing pulse width.

U.S. application Ser. No. 859,515, filed May 5, 1986, invented by R. M. Brooks et al., and assigned to the same assignee as the present invention, discloses thermal printing apparatus having means for measuring the resistance of each individual thermal element, means for selection of individual thermal elements to be energized, and processing means for computing individual thermal element burn values.

SUMMARY OF THE INVENTION

The present invention relates to thermal printers. More particularly, the invention is directed to a control system for compensation of temperatures generated in the thermal print head utilized in a thermal printer or a thermal transfer printer.

In a 40 column printer, it is realized that printing speed may be increased by increasing the number of print elements on the print head. Additionally, it is seen that the placement or positioning of the thermal print elements on the substrate of the print head enables the resolving of at least some of the problems caused by increasing temperatures resulting from increased printing speeds. The present invention provides a control system to regulate firing of the print elements with the proper pulse width in order to compensate for the increasing substrate temperature.

The control system of the present invention is comprised of two separate circuits, namely, a driving circuit and a decision-making circuit. The function of the driving circuit is to turn on and off the thermal print elements. The decision-making circuit executes the substrate temperature coding and executes control codes whereby control signals are sent to the driving circuit for turning on and off the print elements.

The driving circuit includes a plurality of drivers operably associated with five banks each consisting of seven print elements. A plurality of inverters are used as selectors which are connected to the drivers, however, only one of the drivers receives data from the decision-making circuit at any one time. The data stored in the latches of the drivers is determined by the signals from the decision-making circuit and the output duration of the drivers is also controlled by the signal of such circuit.

The decision-making circuit includes a microprocessor connected to a memory which contains a temperature compensation program. The temperature compensation program is executed by the microprocessor according to a series of instructions and depending upon the nature of the instruction, the microprocessor calculates an expression, makes a decision, and sends a dot pattern signal to the driving circuit. When the microprocessor sends a dot pattern to the driving circuit, an internal timer is activated and after duration of the printing, the timer signals the microprocessor to turn off the driving circuit.

There are three types of temperature compensation utilized in the control program. First, a tailored pulse width is used for each bank of print elements to compensate for various print element resistances. Secondly, as the print head is moved or shuttled along the line of printing, the pulse width is reduced for each horizontal dot position. Thirdly, the pulse width is reduced for each successive line of printing.

In view of the above discussion, the principal object of the present invention is to provide a control system for temperature compensation in a thermal printer.

Another object of the present invention is to provide a control system for compensating for various resistances of individual print elements or banks of print elements.

An additional object of the present invention is to provide a control system for compensating for print head substrate heating in the printing of successive columns in a format.

A further object of the present invention is to provide a control system for compensation for print head substrate heating in the printing of successive lines in a format.

Still another object of the present invention is to provide a control system wherein the pulse width is reduced for firing each group of print elements.

Still an additional object of the present invention is to provide a control system wherein the pulse width is reduced for each successive printed column.

Still a further object of the present invention is to provide a control system wherein the pulse width is decreased for each successive line of printing.

Additional objects and advantages of the present invention will become apparent and fully understood from a reading of the following specification taken together with the annexed drawing.

DESCRIPTION OF THE PREFERRED EMBODIMENT

Figure 1:
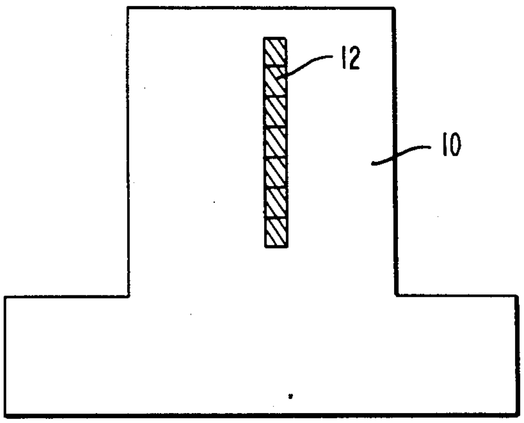
FIG. 1 is a face view of a typical serial print head substrate having a plurality of print elements arranged in vertical manner.

Referring now to the drawing, FIG. 1 is a face view of a typical character-type print head 10 having seven print character elements 12 arranged in vertical manner. Alternatively, the elements may be designed in dot form. The print head 10 is caused to be moved in transverse motion or shuttled across the printer (not shown) in printing operation. Printing speeds of 30 to 50 characters per second can be achieved with this type print head which is usually moved from left to right during the printing portion of the printing cycle, the print head 10 being moved in the opposite direction during the return portion of the cycle. Printing speed is governed or controlled by the amount of time that is required to pulse the thermal element 12 and to allow cooling thereof, such time typically being from 4–6 milliseconds per character or dot position.

Figure 2:
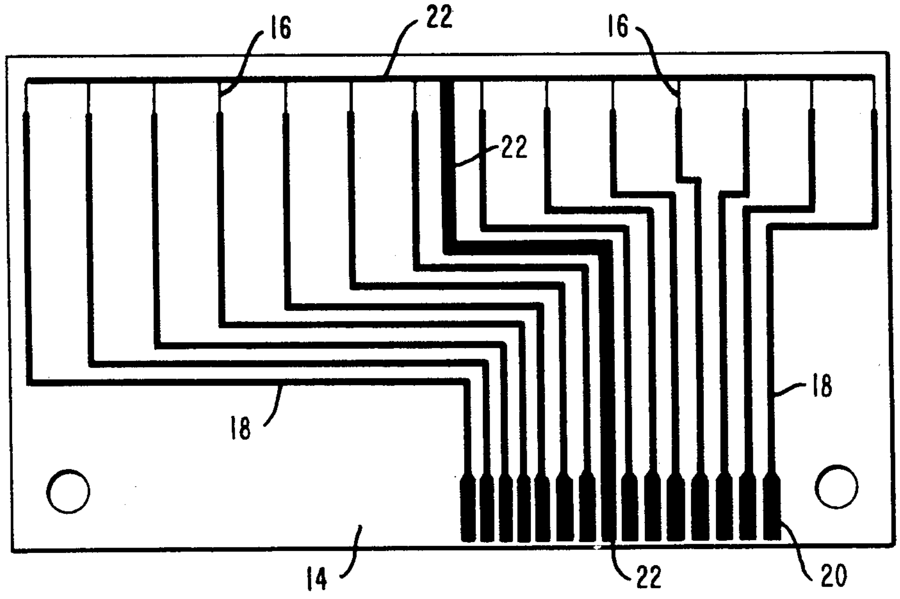
FIG. 2 is a face view of a typical print head substrate illustrating a plurality of print elements arranged in horizontal manner.

A typical shuttling line-of-dots type print head 14 is illustrated in face view in FIG. 2 and shows fourteen print elements 16 disposed in a horizontal arrangement and connected with conductor runs 18, in turn connected to respective pads 20. A common conductor 22 is employed in completing the circuit for the fourteen print elements 16. The print heads 10 and 14 are relatively inexpensive but are only capable of generating low printing speeds.

Figure 3:
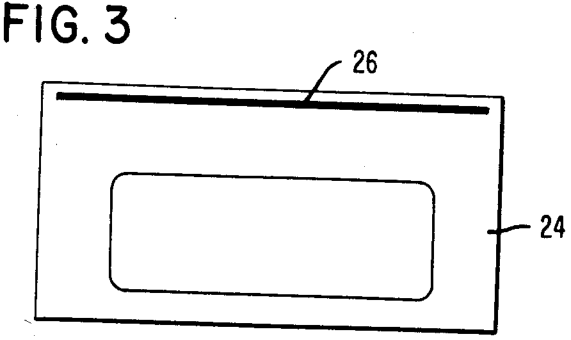
FIG. 3 is a face view of a typical print head illustrating a fixed line-of-dots substrate.

FIG. 3 is a face view of a fixed-type print head 24 which may include 450–600 thermal print elements, for example, in the form of dots, placed along a horizontal line 26 with appropriate conductor means or circuits (not shown) connected to the individual print elements. The fixed print head is capable of printing 200 or more characters per second as there is no requirement to move the print head and also by reason of the larger number of print elements. While the fixed print heads are inherently more costly than the shuttling type print heads, the higher printing speed and higher resolution printing may justify such higher cost.

Figure 4:
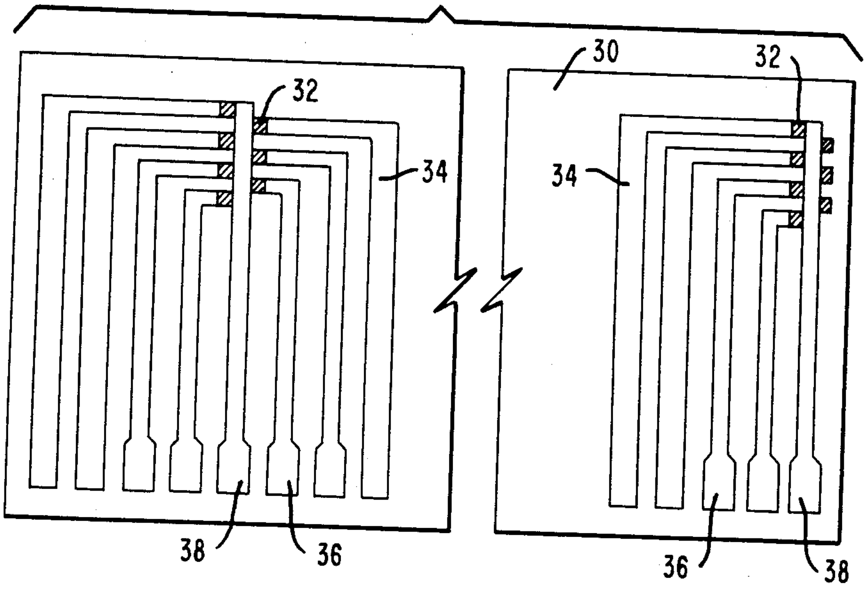
FIG. 4 is a face view of a typical print head showing the print elements and the print element runs or conductors.

The present invention is directed toward and utilizes a shuttling type print head of a design, as illustrated in FIG. 4, wherein a print head substrate 30 carries a plurality of thermal print elements 32 connected by respective conductor runs 34 to pads 36. A common conductor 38 is provided to complete the circuitry for the elements 32. The thermal element 32 is 0.015 inch high, there is a 0.030 inch offset horizontally between the elements, and the conductor runs are spaced at 0.050 inch. If desirable, the horizontal offset between the thermal elements 32 may be increased to 0.060 inch.

Figure 5:
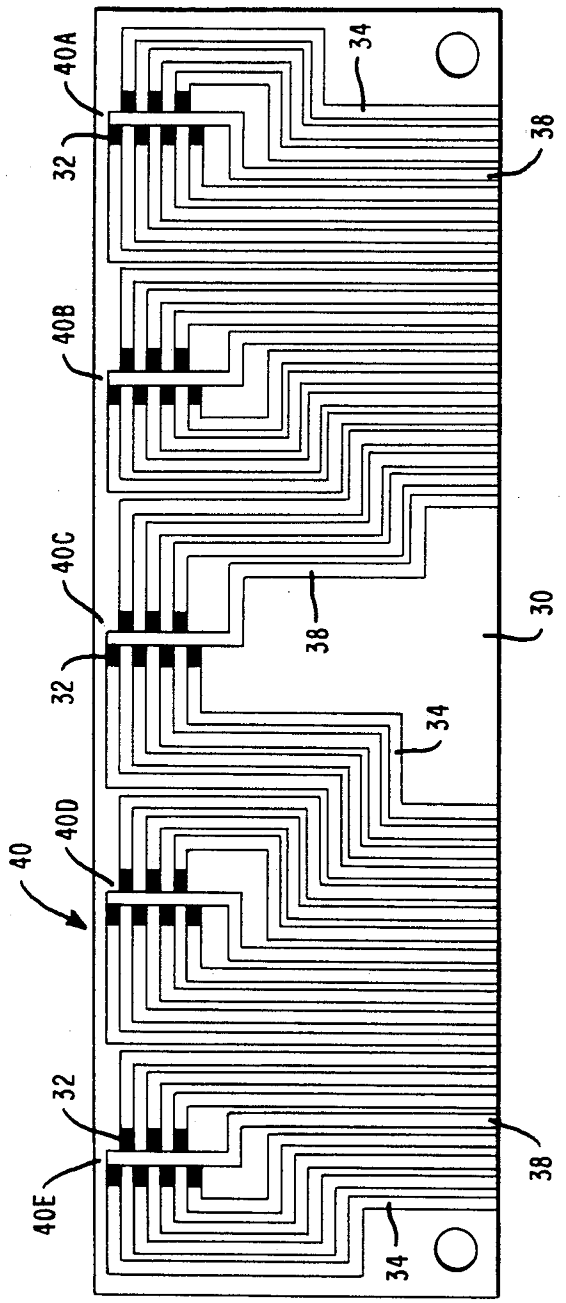
FIG. 5 is a face view of a thermal print head having a plurality of banks of thermal elements employed in the practice of the present invention.

FIG. 5 is a view of the print head substrate 30 which includes five banks, overall indicated as 40, of print elements 32, with each bank 40A, 40B, 40C, 40D, and 40E containing seven print elements. The printing speed is increased by increasing the number of print elements 32 on the substrate 30, thereby increasing the speed by a factor of several times and still maintaining a relatively low cost print head. The five banks (40A–40E) of print elements 32 are arranged and fabricated on one substrate material, and for a thick film type thermal print head which predominantly uses silk screen processes for fabrication, the number of print elements can be increased, say to 35, without incurring substantial increases in print head cost.

Figure 6:
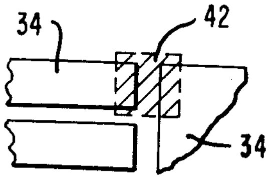
FIG. 6, on the sheet with FIG. 3, is an illustration of an arrangement of conductor runs.
Figure 8:
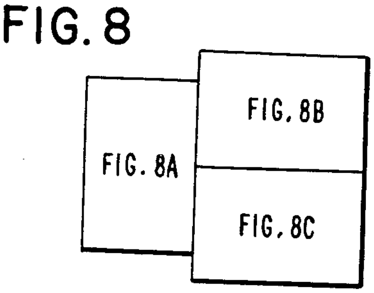
FIG. 8, on the sheet with FIG. 3, is a view illustrating the layout of FIGS. 8A, 8B, and 8C.

FIG. 6 shows a variation in the design of the print head wherein the width of the conductor runs 34 was increased from 0.015 to 0.020 inch and resistor paste 42 bridges the runs. The increased run width provides for lower run resistance and slightly vertically overlapping dots. The horizontal offset of alternate elements 32 in each bank 40 (FIG. 5) thereof permits proper positioning of the conductive runs 34 on the substrate 30 and enables efficient element cooling at the time when the element is not being fired. In operation, the thermal element 32 is pulsed and the printhead 30 is translated horizontally to produce the required dot width on the record medium, such as paper or the like, utilized in printing. This operation may be used and applied for either direct thermal printing onto thermal paper or for thermal transfer printing by use of thermal transfer ribbons.

When multiple print elements are placed on a substrate and are fired sequentially to effect printing, it is well known that the average temperature of the print head substrate increases as a function of time until sufficient residual heat in the substrate causes degradation of the print quality.

The control system of the present invention provides for regulation of the firing of the thermal elements at the proper pulse widths so as to compensate for increasing substrate temperature. First, a tailored pulse width is used for each bank of print elements to compensate for different element resistances. While print head fabrication techniques have produced relatively close values of resistances within each bank of elements, a wide variation may occur from one bank of elements to another bank. Secondly, it is realized that as the print head is shuttled across the record medium, the pulse width is reduced for each horizontal dot position. In the calculation and design of the print head, it is found that since each bank of print elements prints eight characters, the pulse width is reduced 87 times (accounting for both full dot and half dot spacing) for each line printed. Thirdly, the pulse width is reduced for each line printed in the format. Assuming a format of 14 lines, the pulse width is reduced 13 times and then is reset for the next format. It is generally seen that the time between printing successive formats permits the substrate to cool almost to room temperature. The above-described technique of print head fabrication and control system maintains low cost products and provides for printing speeds of 100 to 120 characters per second. The print head design parameters include consideration of the print element dimensions, the velocity of the print head during the printing cycle, the resistance of the print elements, the drive pulse voltage, and the width of the pulse utilized to fire the print element.

It is noted that in the configuration shown in FIG. 6 wherein the width of the conductor runs is 0.020 inch, the horizontal gap between the two numbered runs 34 is set at 0.010 inch realizing that the print element is moving at constant speed during the printing cycle. In order to obtain a dot width slightly in excess of 0.015 inch, the drive pulse width is regulated to provide dot overlay both horizontally and vertically which effects improved character legibility. It is also noted that it is the area between the conductive runs 34, illustrated as resistor paste 42, that heats to permit creation of the printed dot, either by the direct thermal process using a heat sensitive paper, or by the thermal transfer process wherein ink is heated and is transferred from the ink ribbon to the record medium.

Figure 7:
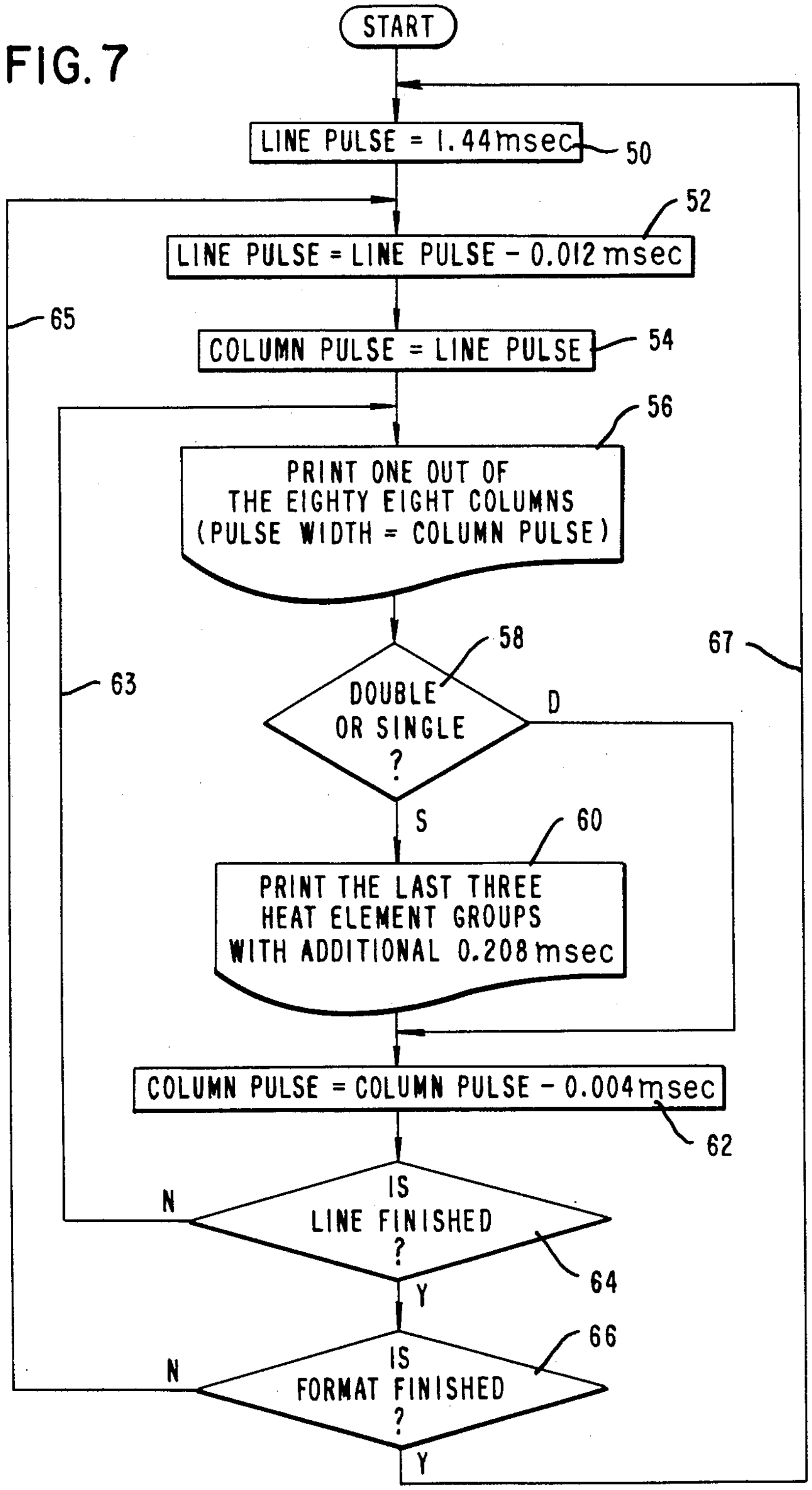
FIG. 7 is a flow chart of temperature compensation.

FIG. 7 is a flow chart illustrating the three types of pulse width adjustment for the temperature control or compensation program of the print head substrate. The apparatus for implementing the various steps of the flow chart of FIG. 7 includes a microcomputer and associated devices, later described. The symbols utilized for illustrating the temperature control codes in the flow chart include a rectangular block as a calculation step, a diamond-shaped block as a decision-making step, and an irregular block as a step to send the dot pattern to the driving circuit. In the flow chart, the line pulse width is defined as equal to the initial value of the pulse width at the beginning of a line of printing, and the column pulse width is defined as equal to the actual value of the pulse width at the time of printing.

The values of the pulse widths written into memory and utilized in the flow chart of FIG. 7 are dependent on the resistance values for the particular print head. The specific control code is, in effect, predetermined by the resistance values and is programmed into memory to enable a microcomputer to execute the temperature compensation program.

The initial block 50 states that the line pulse width equals 1.44 milliseconds. Block 52 reduces or decreases the line pulse width by 0.012 milliseconds whenever a successive line is printed. In the next step, as at 54, the initial value of the column pulse equals the line pulse. In this condition the first printing is effected by the printing of one out of the eighty-eight columns, as shown at 56, wherein it should be noted that each bank 40 of print elements 32 is required to print 88 columns. While in the specific design and model implementing the concept of the present invention, it was deemed not necessary to reduce the pulse width for double wide characters, this routine is illustrated generally in the flow chart, as at block 58. In the case of a single wide character, an additional 0.208 milliseconds is added in accordance with block 60. It is seen that if a double wide character is encountered, the routine of printing the last three heat element groups with an additional time of 0.208 milliseconds, as at step 60, is not required. In the next step, as at 62, the column pulse is reduced by 0.004 milliseconds for each successive column printed. Steps 64 and 66 of the chart inquire as to whether the printed line and the printed format are completed.

If the printed line is not finished at step 64, the flow is returned by way of path 63 to block 56. If the printed format is not finished at step 66, the flow is returned by way of path 65 to block 52. At the completion of the printed format, the flow is returned by way of path 67 to block 50 to start a new cycle of operation. The temperature control code values for successive columns of printing, for successive lines of printing, and for groups or banks of print elements are predetermined and stored in memory for execution by the microcomputer to effect changes in pulse width.

It is noted that the control circuitry of the present temperature compensation system is divided into and includes two separate circuits—the driving circuit and the decision-making circuit. The function of the driving circuit is to turn on and off the print elements 32. The decision-making circuit executes control codes, sending control signals to the driving circuit for turning on and off the print elements.

Figure 8A:
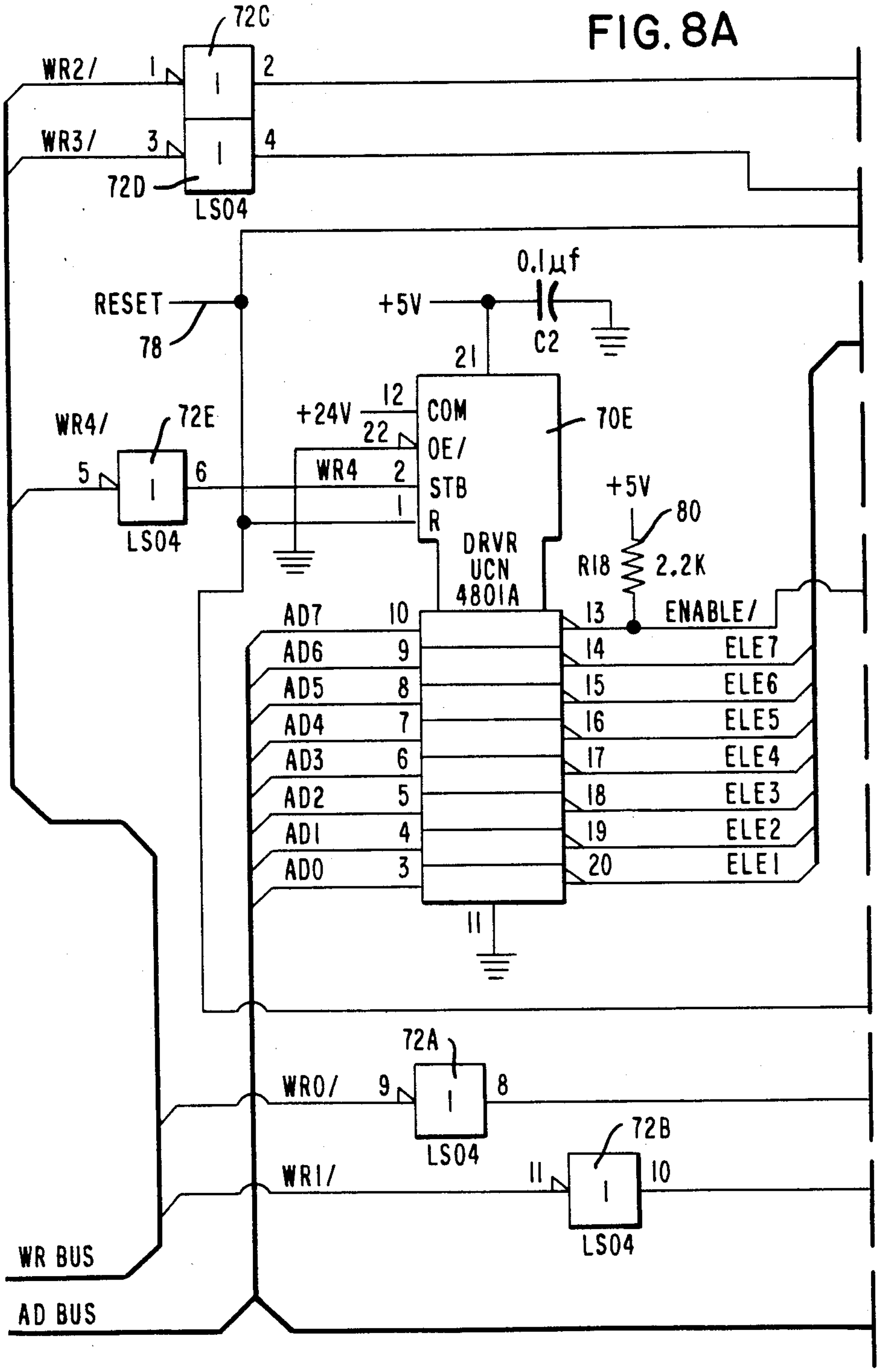
FIGS. 8A, 8B, and 8C constitute a schematic diagram of the driving circuit of the control system.
Figure 8B:
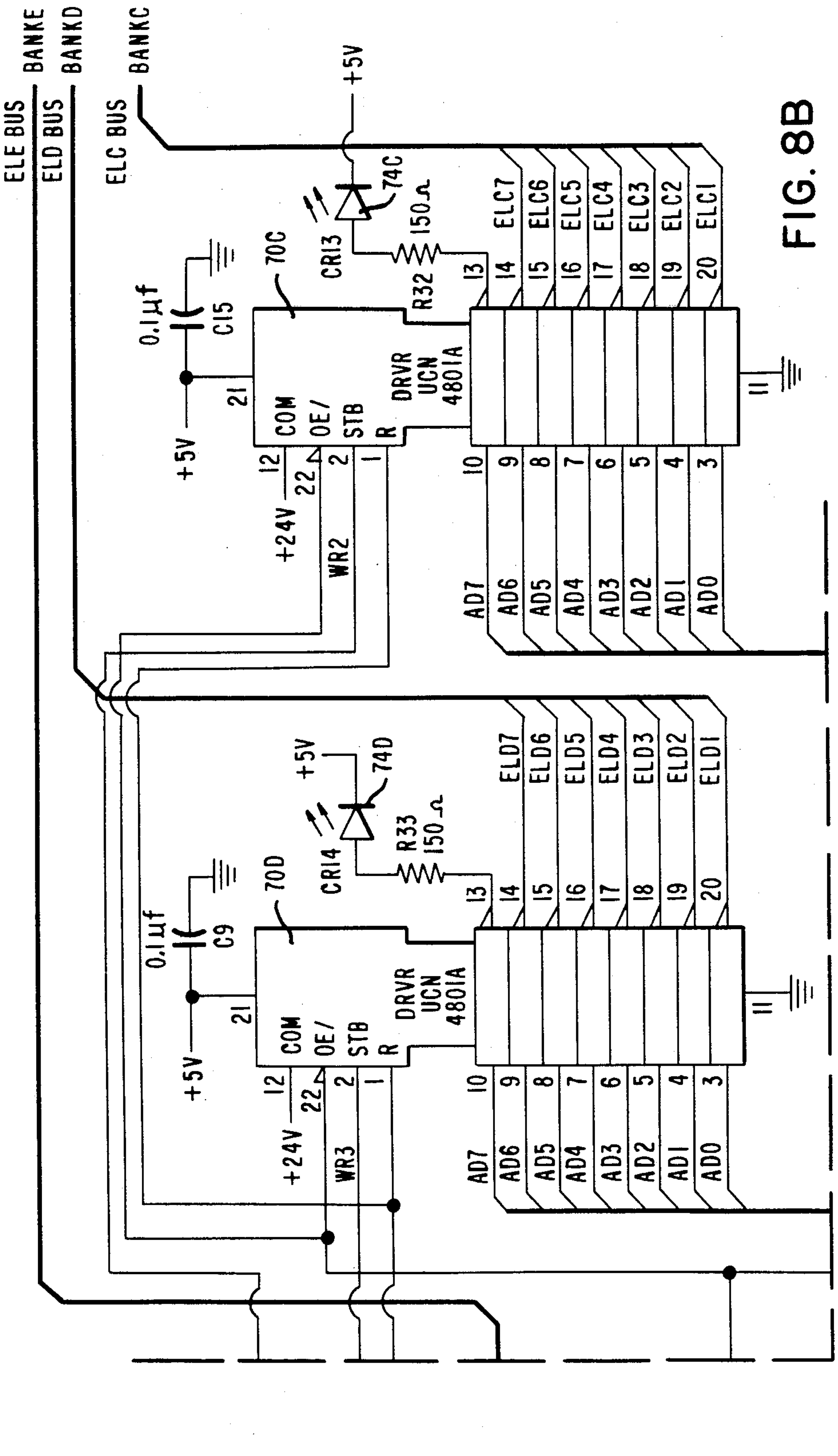
Figure 8C:
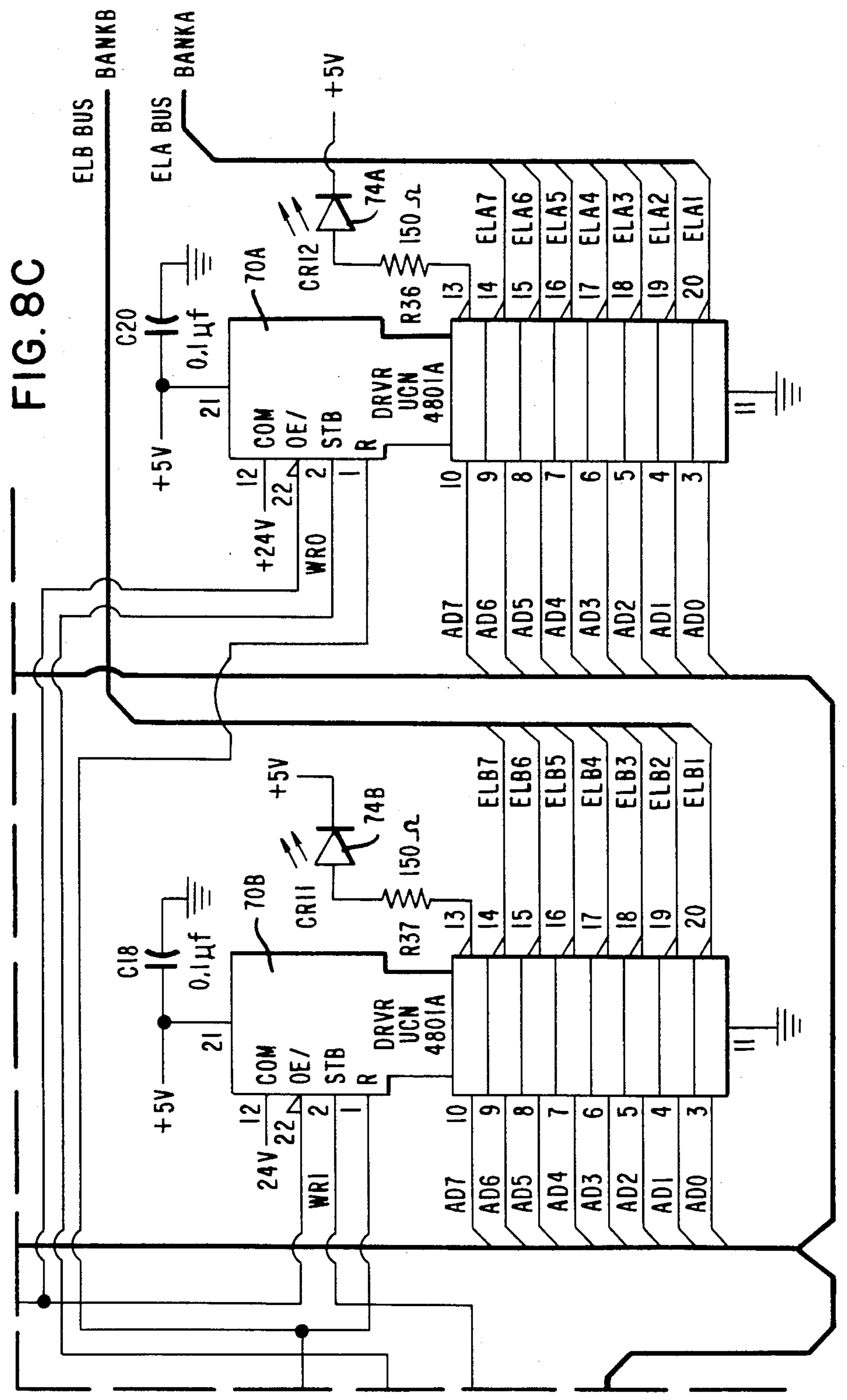

The schematic diagram of the driving circuit for the print elements is shown in FIGS. 8A, 8B and 8C. The 35 print elements 32 of the print head 30, illustrated in FIG. 5, are divided into the five banks (40A–40E) of seven elements in each bank. FIG. 8A shows a driver integrated circuit device 70E for print element bank 40E (FIG. 5), FIG. 8B shows a like driver integrated circuit device 70D for print element bank 40D and a like device 70C for bank 40C. FIG. 8C shows like devices 70B and 70A for banks 40B and 40A, respectively. It is thus seen that each one of the devices 70A–70E drives one bank 40 of print elements 32. At any one instant, only one of the devices 70A–70E is activated by an inverter 72A–72E to receive data from the decision-making circuit.

Figure 9:
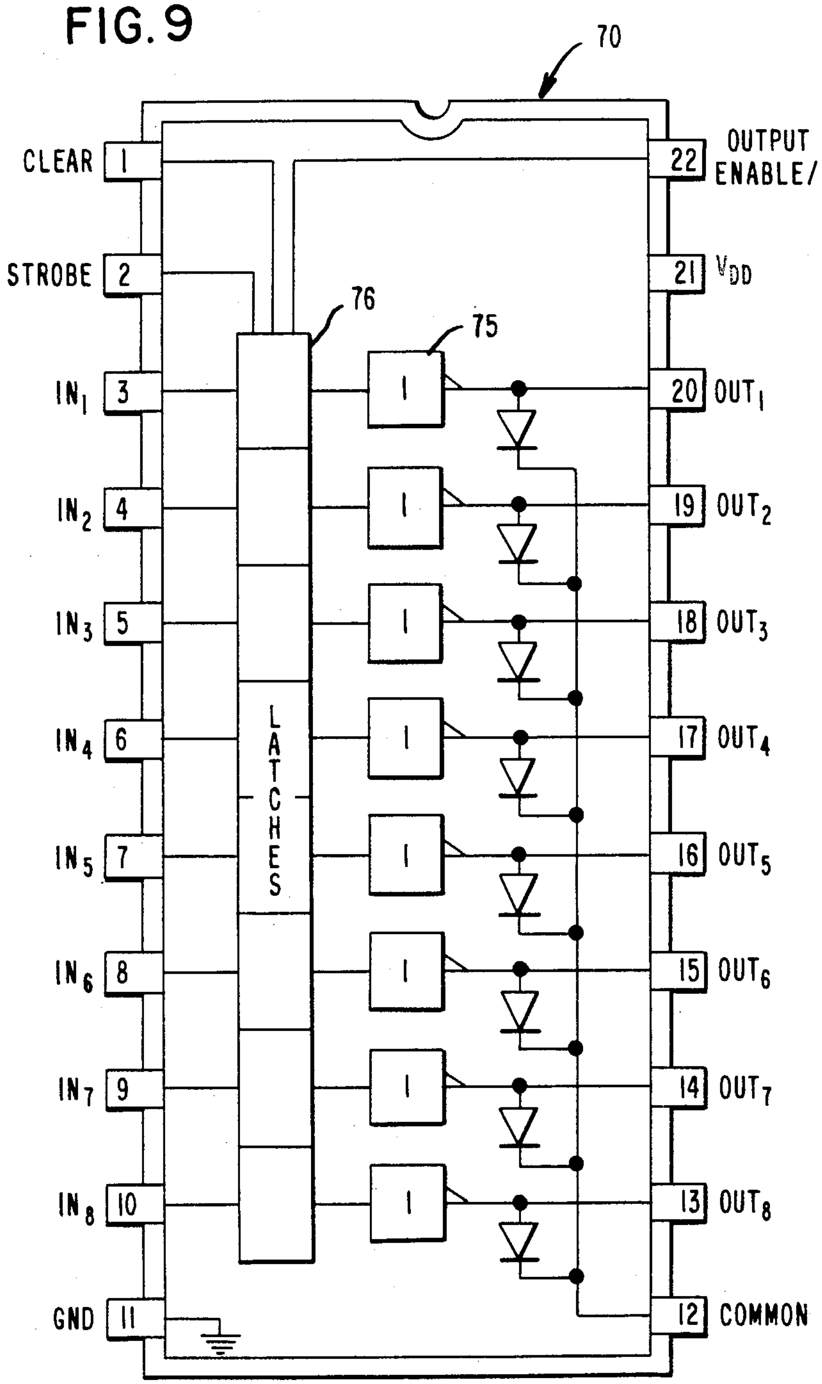
FIG. 9 is a connection diagram for an integrated circuit driver device.

The pin configuration of each of the driver integrated circuit devices (70A–70E) is shown in FIG. 9. Each of such integrated circuit devices contains eight drivers 75 and eight latches 76. Only the seven lower order drivers, from number 1 to number 7 and indicated as $OUT_1$ to $OUT_7$, are used to drive the print elements 32. Each number 8 driver, indicated as $OUT_8$, of devices 70A, 70B, 70C and 70D (FIGS. 8B and 8C) is connected to a light emitting diode, as 74A, 74B, 74C and 74D, such diodes being used for diagnostic purposes, and which do not form a part of the present invention. The function of such diodes is to provide a visual indication of circuit operation.

In FIG. 8A, the number 8 driver (pin 13) of device 70E is connected to the OUTPUT ENABLE pins (pin 22) of each of the devices 70A, 70B, 70C and 70D, wherein such configuration permits simultaneous activation of the outputs of the devices 70A, 70B, 70C and 70D.

The outputs of the inverters 72A–72E (FIG. 8A) are connected to the STROBE pins (pin 2) of the respective driver devices 70A–70E. By reason of the signals from the decision-making circuit, only one of the inverters 72A–72E can be in the logic high state at any one time, so the effect is that only one of the driver devices 70A–70E is allowed to receive data from such decision-making circuit.

The data stored in the latches, as shown at 76 of one of the driver devices 70 (FIG. 9), is determined by the signals from the decision-making circuit. A RESET pulse, as 78 (FIG. 8A), is generated when the power is turned on, it being noted that all outputs of the driver devices 70A–70E are reset to the off state by such RESET pulse.

First, the decision-making circuit sends a low level signal to the input pin of inverter 72A, this signal being a high level signal at the output of such inverter for enabling driver 70A to receive data. The decision-making circuit sends the data which contains the dot pattern to be printed by print bank 40A (FIG. 5) to the address line AD0 through AD6 of driver 70A (FIG. 8C). The data from the address line AD0–AD6 is stored in the several latches 76 of driver 70A, and since there is no enabling signal from driver 70E, the outputs of driver 70A remain in the off condition. After the data has been loaded into the latches 76 of driver 70A, the next driver 70B is selected by the signal from the decision-making circuit. Accordingly, the loading process is repeated in sequential manner until all of the drivers 70A–70E are loaded with data.

The output duration of the drivers 70A–70E is controlled by the signal of the decision-making circuit. By reason that the OUTPUT ENABLE pin 22 of driver 70E is connected to ground, such driver is maintained in the enable state, which allows such driver to send the data to its output immediately after the data is received. Since the OUTPUT ENABLE/ pin 13 of driver 70E is connected to the OUTPUT ENABLE pins of drivers 70A–70D, the data stored in these drivers 70A–70D is latched to their outputs when they are enabled by pin 13 or output number 8 (FIG. 9) of driver 70E. This arrangement provides that the dot patterns of all five print banks (40A–40E) can be printed at the same instant, and after a predetermined or specified duration, the decision-making circuit turns off all the print elements 32 by sending low level data to all the inputs of driver 70E. In addition, the outputs of drivers 70A, 70B, 70C and 70D are disabled by the high level condition created by the pull-up resistor 80 connected to pin 13 of driver 70E (FIG. 8A).

Figure 10:
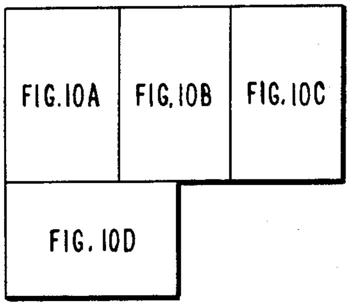
FIG. 10 is a view illustrating the layout of FIGS. 10A, 10B, 10C and 10D.
Figure 10A:
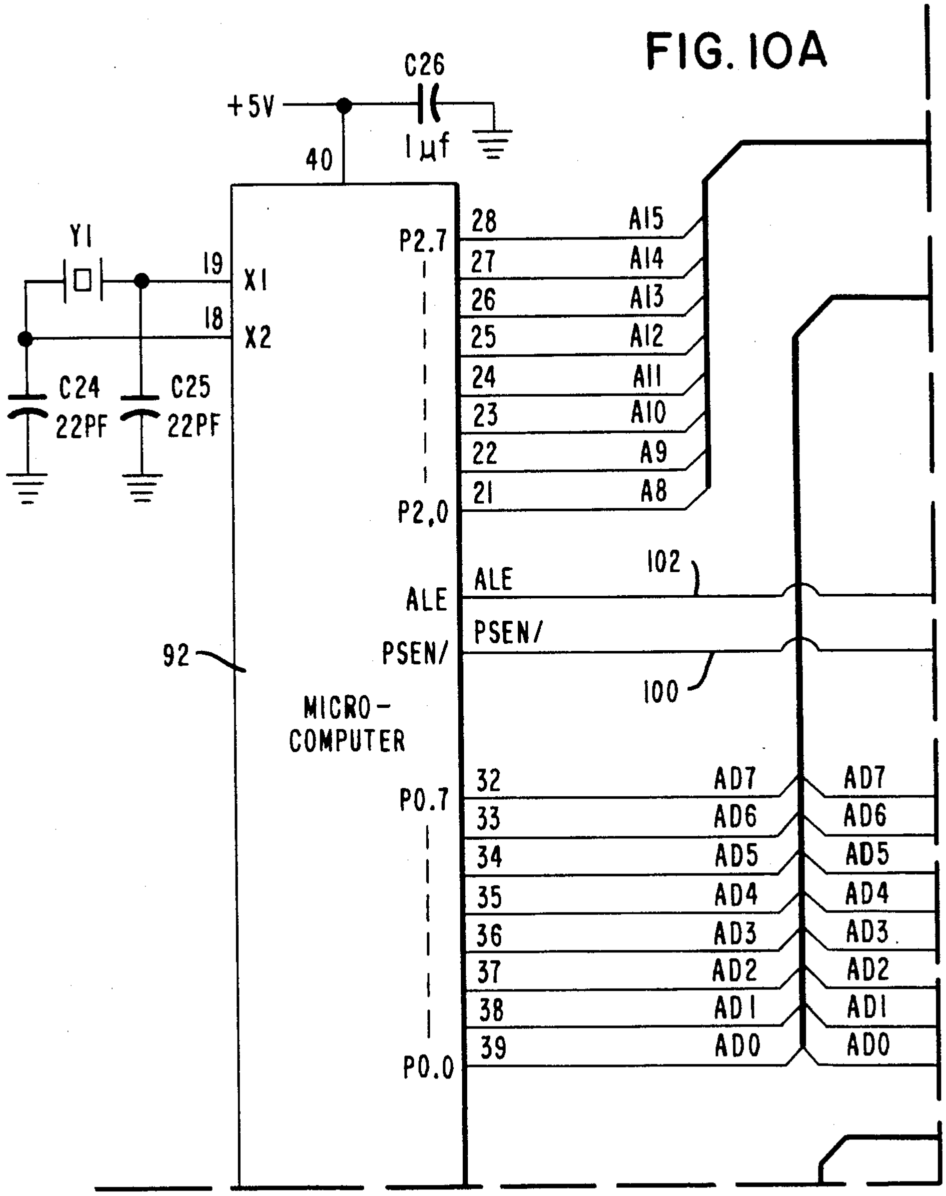
FIGS. 10A, 10B, 10C and 10D constitute a schematic diagram of the decision-making circuit of the control system.
Figure 10B:
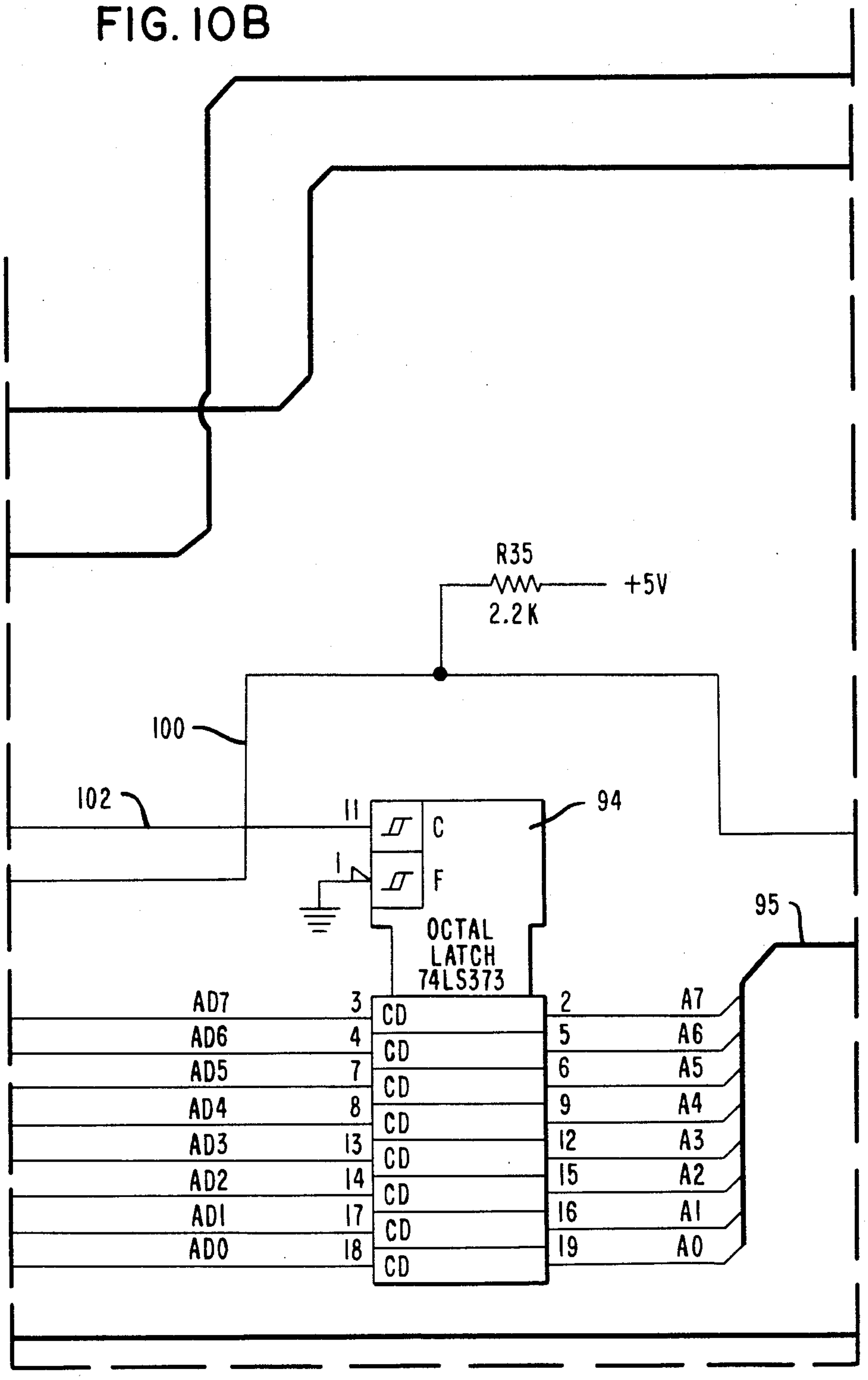
Figure 10C:
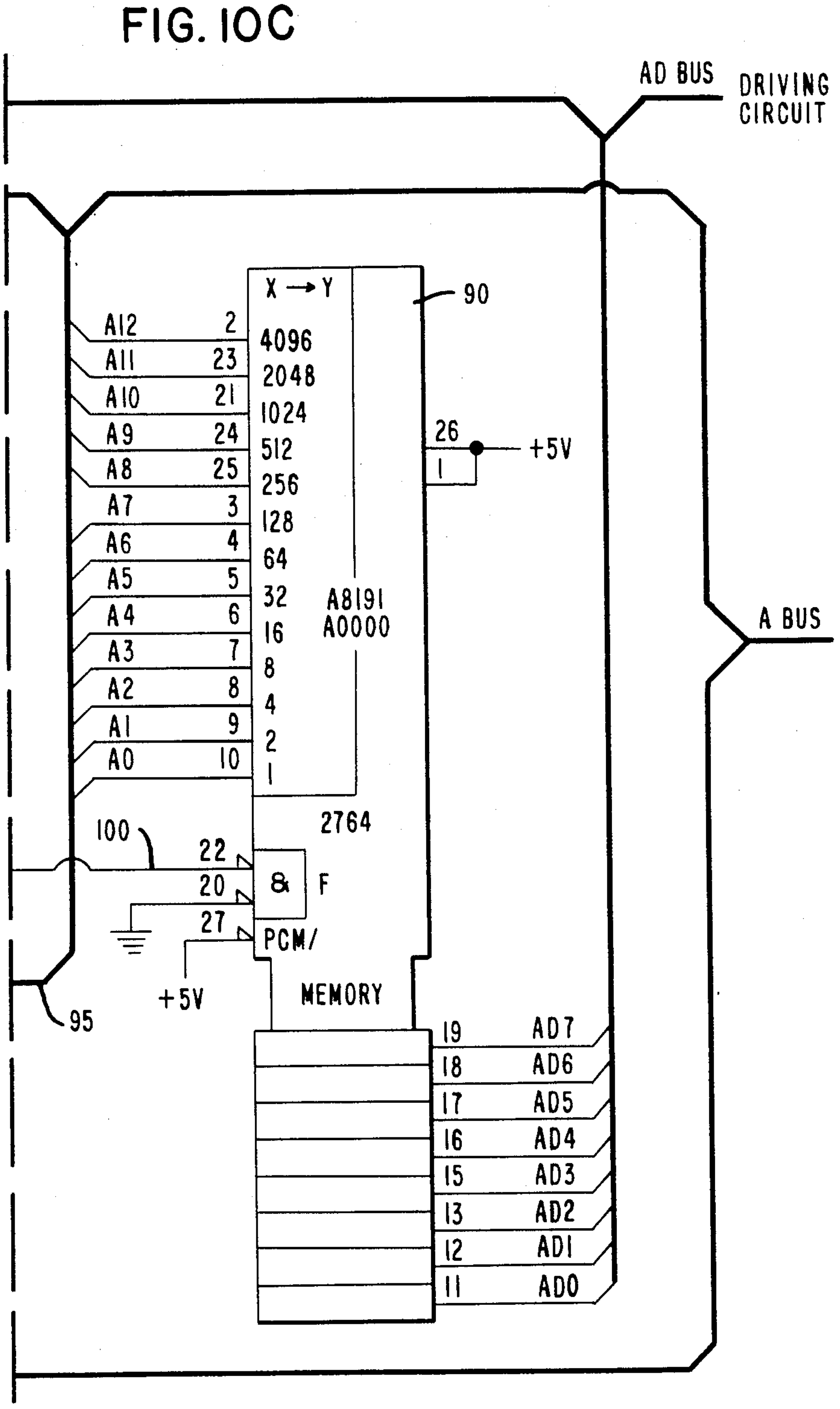
Figure 10D:
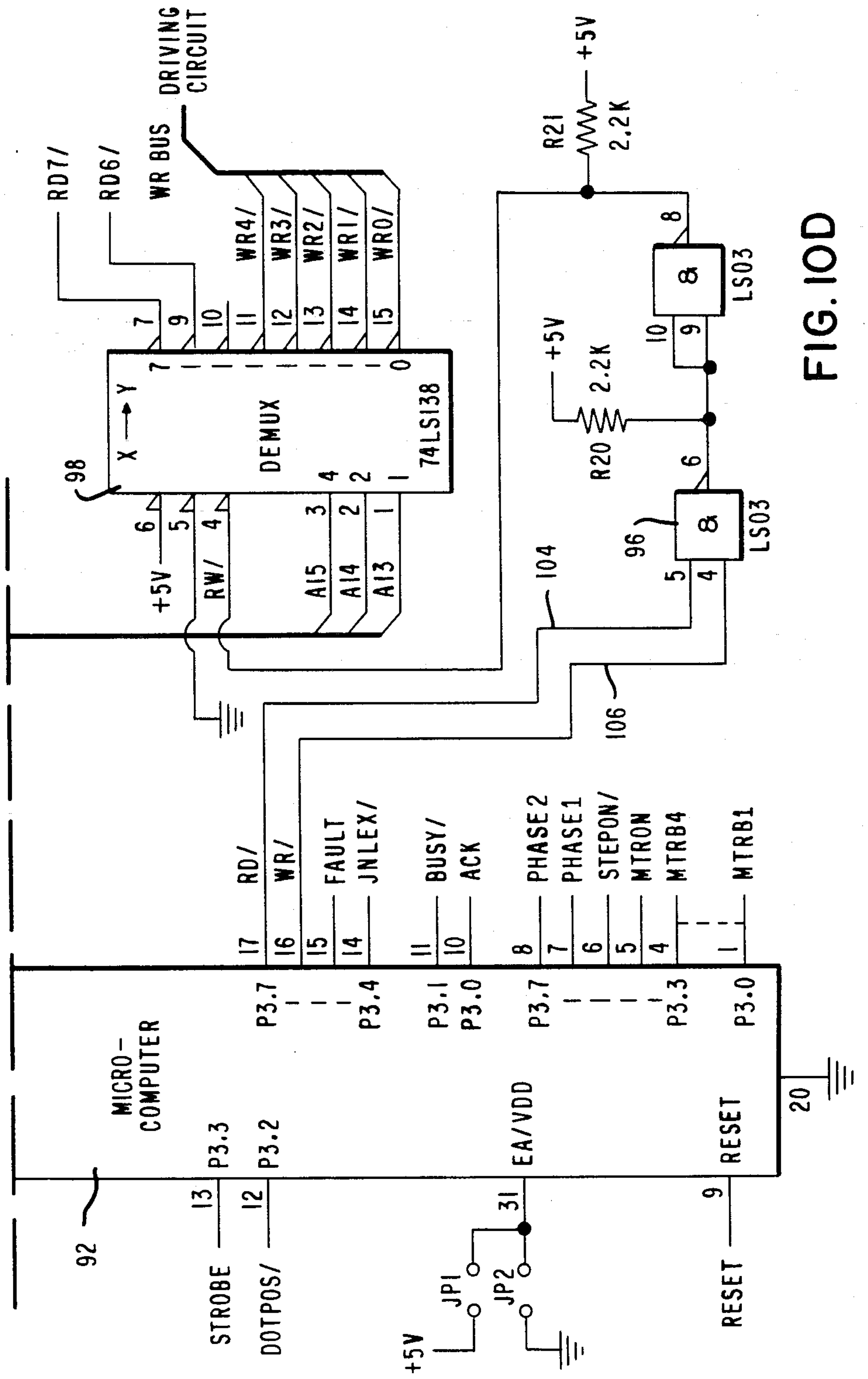

The schematic diagram of the decision-making circuit of the present control system is shown in FIGS. 10A, 10B, 10C and 10D. An electrically programmable read only memory 90 (FIG. 10C) is connected to a microcomputer 92 (FIG. 10A). In order to prevent the overloading of the address output of the microcomputer 92, a tri-state latch 94 (FIG. 10B) is connected between the address output of the microcomputer 92 and the address bus line 95. A NAND gate 96 (FIG. 10D) combines the signals from the READ and WRITE pins (17 and 16 of microcomputer 92), and the combined signal is used to drive a three-to-eight line demultiplexer 98.

The temperature compensation program, as shown in FIG. 7, is stored in the electrically programmable memory 90. First, the temperature control codes are written into memory 90 according to the flow chart of FIG. 7, and the codes are then read sequentially out of memory 90. In the execution of the temperature compensation program, the microcomputer 92 activates the memory 90 by $\overline{\text{PSEN}}$ signal 100 and address signals A0 to A12 (FIGS. 10A, 10B and 10C), and the program is fetched instruction by instruction. By reason of the existence of the octal tri-state latch 94 (FIG. 10B), the ALE signal 102 (FIG. 10A) is used to provide a properly timed signal to latch the low byte of address from ports P0.0–P0.7 microcomputer 92 to the individual latch elements of the octal latch 94.

The temperature control program is executed in the microcomputer 92 according to the flow chart routine illustrated in FIG. 7. Depending upon the nature of the instruction which is fetched from the memory 90, the microcomputer 92 calculates an expression, makes a decision and sends a dot pattern to the driving circuit. When the microcomputer 92 is required to send a dot pattern to the driving circuit, an internal timer inside the microcomputer is initialized and activated. After the printing duration, the timer signals the microcomputer 92 to turn off the driving circuit.

The three-to eight-line demultiplexer 98 is utilized to determine and select which driver (70A–70E) receives a dot pattern. The RD/ and WR/ signals 104 and 106 (FIG. 10D), activated by MOVX instruction, drive the NAND gate 96. The MOVX instruction looks to see if any data is available and moves data from memory to the printer driver circuit. As a result, either the RD/ or the WR/ signal can enable the demultiplexer 98 and by use of the signals in address lines A13, A14 and A15 (FIG. 10A), one of the seven outputs of the demultiplexer is selected to drive the strobe of a specified driver 70A–70E.

Having described the control electronics, it is noted that the pulse width of the firing pulse can be regulated to compensate for increasing print head substrate temperature. The following discussion describes the control methods used for pulse width compensation. Three types or methods of pulse width control are utilized in the present invention.

The print head substrate heats up as the print head travels along and prints each line of a format. In order to obtain an even printing of the lines of such format, the line pulse width is decreased by 0.012 milliseconds after printing of each line. According to FIG. 7, the initial value of the pulse width is set to $(1.440-0.012)$ equalling 1.428 milliseconds. This value is variable and is stored in a location, named LINE PULSE, which is a data memory location in the microcomputer 92. LINE PULSE is the initial pulse width value of each and every line of the format. After the first line of the format is printed, LINE PULSE is decreased or reduced by 0.012 milliseconds before the next line of the format is printed. This subtraction is implemented by the hardware inside the microcomputer 92, and the result is stored back into LINE PULSE. The value of LINE PULSE for each line is set out as follows:

Line 1: 1.428 milliseconds
Line 2: 1.416 milliseconds
Line 3: 1.404 milliseconds
Line 4: 1.392 milliseconds
Line 5: 1.380 milliseconds
Line 6: 1.368 milliseconds
Line 7: 1.356 milliseconds The print head temperature also increases when it prints successive columns in a format. Therefore, the pulse width is reduced for each successive column printed. Since every heat element bank 40A–40E is required to print 88 columns, taking into account full and half-dot spacing, the pulse width is reduced by 0.004 milliseconds in between the columns. A variable value in a memory location, named COL PULSE, is used to store the pulse width value in the control program. It is noted that the initial value of COL PULSE is the value stored in LINE PULSE and that COL PULSE is another data memory location in the microcomputer 92. The value of COL PULSE for line 1 of each column is set out as follows:

| COLUMN | 1 | 2 | 3 | 4 | 5 | 6 | 7 |
|---|---|---|---|---|---|---|---|
| COL PULSE | 1.428 | 1.424 | 1.420 | 1.416 | 1.412 | 1.408 | 1.404 |

Referring back to the previous chart for lines 1 to 7, is seen that for the first line of the format, COL PULSE for column 1 equals 1.428 milliseconds, for the second line of the format, COL PULSE for column 1 equals 1.416 milliseconds, for the third line of the format, COL PULSE for column 1 equals 1.404 milliseconds, and so forth.

The third method of control deals with variations in resistance between print element banks 40A–40E. Based upon a sampling of 10–20 print heads, it was found that print element 32 resistance values were similar in each bank or group (40A–40E) of seven print elements, although greater resistance variation was encountered from one group or bank to another. Therefore, pulse width was set or calculated for each group or bank (40A–40E) of print elements 32 as dictated by the resistance characteristics of the particular print head. One set of selected typical values is as follows:

| Bank | A | B | C | D | E |
|---|---|---|---|---|---|
| Pulse Width | 1.5 | 1.5 | 1.7 | 1.7 | 1.7 |

It was found that banks C, D and E required an additional $(1.7-1.5)$ equalling 0.2 milliseconds pulse width in order to achieve print control equal to that of banks A and B. The additional 0.2 millisecond pulse is fired according to the following sequence. After all five banks of elements have been fired by a 1.5 millisecond pulse, all the print elements are turned off by the signal from the microcontroller. The dot patterns of banks C, D and E are then again loaded into drivers 70C, 70D and 70E.

The timer inside the microcomputer 92 is set to 0.208 milliseconds and the print elements of banks 40C, 40D and 40E are turned on. When the timing is completed, the driving circuit is turned off by the microcomputer 92. As a result, banks 40C, 40D and 40E are driven with a pulse width of (1.428+0.208) equalling 1.636 milliseconds. The following data are calculated and stored in the control program.

| | Banks A & B | | | Banks C, D and E | | |
|---|---|---|---|---|---|---|
| Column | 1 | 2 | 3 | 1 | 2 | 3 |
| Line 1 | 1.428 | 1.424 | 1.420 | 1.636 | 1.632 | 1.628 |
| Line 2 | 1.416 | 1.412 | 1.408 | 1.624 | 1.620 | 1.616 |
| Line 3 | 1.404 | 1.400 | 1.396 | 1.612 | 1.608 | 1.604 |
| Line 4 | 1.392 | 1.388 | 1.384 | 1.600 | 1.596 | 1.592 |
| Line 5 | 1.380 | 1.376 | 1.372 | 1.588 | 1.584 | 1.580 |
| Line 6 | 1.368 | 1.364 | 1.360 | 1.576 | 1.572 | 1.560 |
| Line 7 | 1.356 | 1.352 | 1.348 | 1.564 | 1.560 | 1.548 |

The above figures show a decrease or reduction of the pulse width by 0.012 milliseconds from one line to the next in a format, a decrease or reduction of the pulse width by 0.004 milliseconds from one column to the next, and that an additional 0.2 milliseconds is required for certain banks of print elements.

It is thus seen that herein shown and described is a temperature compensation system for thermal printing operations which provides for a decrease in the pulse width for firing print elements from one line to the next line in a printing format, which provides for a decrease in the pulse width for firing print elements from one column to the next column, and which provides for an increase in pulse width for firing print elements in certain banks of print elements relative to print elements in other banks. The temperature compensation control system of the present invention enables the accomplishment of the objects and advantages mentioned above, and while a preferred embodiment has been disclosed herein, variations thereof may occur to those skilled in the art. It is contemplated that all such variations not departing from the spirit and scope of the invention hereof are to be construed in accordance with the following claims.

We claim:

1. A thermal printing control system for a print head having a plurality of printing elements positioned in offset manner and isolated from each other, said control system including a
   - voltage source for energizing the printing elements, a
   - driving circuit including a plurality of drivers connected to the voltage source and operable to turn the printing elements on and off, a
   - decision-making circuit programmed to accommodate changes in temperature of the print head during printing operations, the decision-making circuit including programmable memory means for storing predetermined temperature control code values of the printing elements, the temperature control code values being written to change the time for energizing the print element drivers during such printing operations relevant to the resistance values of the particular print elements utilized during such prnting operations, and
   - processor means coupled to the driving circuit and the decision-making circuit and responsive to the temperature control code values for sending dot pattern signals one at a time in sequential manner to selected print element drivers for operating the driving circuit.

2. The control system of claim 1 including means for storing temperature control code values which may vary in accordance with successive printing positions in a line of printing.

3. The control system of claim 1 including means for storing temperature control code values which may vary in accordance with successive lines of printing in a format.

4. The control system of claim 1 wherein the print head includes a plurality of banks of printing elements having a respective print element driver for each bank and the temperature control code values are written in accordance with resistance values of the banks of printing elements.

5. The control system of claim 4 wherein the driving circuit includes an integrated circuit driver for each bank of printing elements.

6. The control system of claim 1 wherein the driving circuit includes an integrated circuit driver having latch means coupled to respective printing elements.

7. The control system of claim 1 wherein the decision-making circuit includes latch means coupled to the processor means and to the driving circuit.

8. The control system of claim 1 wherein the decision-making circuit includes selection means for sequentially directing the control codes to the driving circuit.

9. A temperature compensation system in a thermal printer having a plurality of banks of printing elements, the printing elements of each bank being positioned in offset manner and spaced from each other, said system including a
   - voltage source for energizing the printing elements, a
   - driving circuit coupled to the voltage source and including a plurality of drivers operable to turn the printing elements on and off in accordance with precise pulse widths, a
   - decision-making circuit having means programmed to compensate for changes in temperature of the print head during printing operations, the programmed means comprising predetermined temperature control codes in accordance with resistance values of the banks of printing elements, the control codes being written to change the pulse width for energizing the drivers during such printing operations for the particular banks of printing elements utilized during such printing operations and relevant to the resistance values of the banks of printing elements, and
   - processor means coupled with the driving and decision-making circuits and responsive to the temperature control codes for sending dot pattern signals one at a time in sequential manner to selected print element drivers for operating the driving circuit.

10. The system of claim 9 including means for storing temperature control codes which may vary in accordance with successive printing positions in a line of printing.

11. The system of claim 9 including means for storing temperature control codes which may vary in accordance with successive lines of printing in a format.

12. The system of claim 9 wherein the driving circuit includes an integrated circuit driver for each bank of printing elements.

13. The system of claim 9 wherein the driving circuit includes an integrated circuit driver having latch means coupled to respective printing elements.

14. The system of claim 9 wherein the decision-making circuit includes latch means coupled to the processor means and to the driving circuit.

15. The system of claim 9 wherein the decision-making circuit includes selection means for sequentially directing the control codes to the driving circuit.

16. A thermal printer having a plurality of banks of printing elements movable in transverse direction across a record medium in printing operations, the printing elements of each bank being positioned in offset manner and spaced from each other, and said printer including a source of voltage for energizing the printing elements, a driving circuit connected to the source of voltage and having a plurality of drivers operable to turn the banks of printing elements on and off, a decision-making circuit programmed to compensate for changes in temperature of the print head during printing operations, the decision-making circuit including programmable memory means for storing predetermined temperature control codes in accordance with resistance values of the banks of printing elements, the control codes being written to increase the time for energizing the drivers during such printing operations for the particular banks of printing elements relevant to the resistance values of the banks of printing elements, and processor means coupled with the driving and decision-making circuits and responsive to the temperature control codes for sending dot pattern signals one at a time in sequential manner to selected print element drivers for operating the driving circuit.

17. The thermal printer of claim 16 including means for storing temperature control codes which may vary in accordance with successive printing positions in a line of printing.

18. The thermal printing of claim 16 including means for storing temperature control codes which may vary in accordance with successive lines of printing in a format.

19. The thermal printer of claim 16 wherein the driving circuit includes an integrated circuit driver for each bank of printing elements and each driver includes latch means coupled to respective printing elements.

20. The thermal printer of claim 1 wherein the decision-making circuit includes latch means coupled to the processor means and to the driving circuit, and also includes selection means for sequentially directing the control codes to the driving circuit.

21. A thermal printer control system for a print head having a plurality of individual print elements positioned in offset manner and spaced from each other, said control system including a voltage source for energizing the print elements, a driving circuit including a plurality of drivers connected to the voltage source and operable to turn the print elements on and off, a decision-making circuit programmed to accommodate changes in temperature of the print head during printing operations, the decision-making circuit including memory means for storing predetermined control code values for successive printing positions along a line of printing, the control code values being written to decrease the time of energization of the particular print element drivers utilized during printing operation for such successive printing positions, and processor means coupled with the driving and decision-making circuits and responsive to the control code values for sending dot pattern signals one at a time in sequential manner to selected print element drivers for operating the driving circuit.

22. The control system of claim 21 wherein the driving circuit includes inverter means for receiving a signal from the decision-making circuit for activating a respective print element driver.

23. The control system of claim 21 wherein the decision-making circuit includes an octal latch coupled to the processor means and to the driving circuit to control address output of the processor means.

24. The control system of claim 21 wherein the decision-making circuit includes selection means coupled to the processor means and to the driving circuit for selecting the print element driver receiving the dot pattern signal.

25. A thermal printer control system for a print head having a plurality of individual print elements positioned in offset manner and spaced from each other, said control system including a voltage source for energizing the print elements, a driving circuit including a plurality of drivers connected to the voltage source and operable to turn the print elements on and off in accordance with precise pulse widths, a decision-making circuit having means programmed to compensate for changes in temperature during printing operations, the programmed means comprising predetermined temperature control codes for successive lines of printing in a format, the control codes being written to decrease the time of energization of the pulse width of the particular print element drivers utilized during printing operations for such successive lines of printing, and processor means coupled with the driving and decision-making circuits and responsive to the temperature control codes for sending dot pattern signals one at a time in sequential manner to selected print element drivers for operating the driving circuit.

26. The control system of claim 25 wherein the driving circuit includes inverter means for receiving a signal from the decision-making circuit for activating a respective print element driver.

27. The control system of claim 25 wherein the decision-making circuit includes an octal latch coupled to the processor means and to the driving circuit to control address output of the processor means.

28. The control system of claim 25 wherein the decision-making circuit includes selection means coupled to the processor means and to the driving circuit for selecting the print element driver receiving the dot pattern signal.

* * * * *